United States Patent
Probst

[11] Patent Number: 5,982,899
[45] Date of Patent: *Nov. 9, 1999

[54] METHOD FOR VERIFYING THE CONFIGURATION THE COMPUTER SYSTEM

[75] Inventor: Jürgen Probst, Wildberg, Germany

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,764

[22] PCT Filed: Aug. 11, 1995

[86] PCT No.: PCT/EP95/03186

§ 371 Date: Dec. 16, 1996

§ 102(e) Date: Dec. 16, 1996

[87] PCT Pub. No.: WO97/07463

PCT Pub. Date: Feb. 27, 1997

[51] Int. Cl.⁶ .............................. H04L 9/00; H04L 9/30
[52] U.S. Cl. .................................. 380/25; 380/4; 380/9; 380/23; 380/30; 380/49; 380/50
[58] Field of Search ................... 380/4, 9, 23, 25, 380/28, 30, 49, 50, 59; 705/410

[56] References Cited

U.S. PATENT DOCUMENTS

| | | | |
|---|---|---|---|
| 4,796,220 | 1/1989 | Wolfe | 380/4 |
| 5,077,660 | 12/1991 | Haines et al. | 705/410 |
| 5,182,770 | 1/1993 | Medveczky et al. | 380/4 |
| 5,365,587 | 11/1994 | Campbell et al. | 380/25 |
| 5,388,157 | 2/1995 | Austin | 380/4 |
| 5,499,295 | 3/1996 | Cooper | 380/23 |
| 5,553,144 | 9/1996 | Almquist et al. | 380/25 |
| 5,671,281 | 9/1997 | Campbell et al. | 380/25 |
| 5,757,907 | 5/1998 | Cooper et al. | 380/4 |

*Primary Examiner*—Bernarr E. Gregory
*Attorney, Agent, or Firm*—Marc A. Ehrlich

[57] ABSTRACT

A method for verification of configuration data which is expressive of the configuration of a computer system. A computer system having configuration data stored therein, further includes an identifier for uniquely identifying the computer system. A copy of the stored configuration data is encoded via an encoding method which uses the identifier, and the encoded configuration data is encrypted via an encryption method which uses a private key. Subsequently, the encrypted configuration data is decrypted via a decryption method using a public key producing a decrypted result. The decrypted result may either be decoded using the identifier and compared to the stored configuration data or alternatively the stored configuration data may be encoded using the identifier and compared to the decrypted result.

20 Claims, 2 Drawing Sheets

METHOD FOR VERIFYING THE CONFIGURATION THE COMPUTER SYSTEM

METHOD FOR VERIFYING THE CONFIGURATION COMPUTER SYSTEM

The invention relates to a method for verifying configuration of a computer system, to a method for encryption of data being expressive of the configuration of a computer system and to a computer system for carrying out such a method.

It is well known from the prior art to use passwords for security and verification purposes. There have been for many years password generators for a Person Identification Number (PIN). PINs have been used to gain access to automated tellers and security areas when unattended operation and/or verification of authorization is desired. They have been used for granting access to computers, as illustrated by U.S. Pat. No. 4,799,258 to Davies et al granted Jan. 17, 1989. PINS may be generated automatically, and may be generated by random number generators or pseudo-random number sequences stored in the memory of a computer. U.S. Pat. No. 4,800,590 to James C. Vaughan illustrates a password generating device for generating passwords, and a computer access system based upon the generated secure number based on time such that the algorithm is valid only over a 3 minute window. However, the lock or unlock of a computer system e.g. the host computer of Vaughan does not satisfy needs which are now possible to achieve. In particular doesn't deal with repetitive modification of machine function and permits a range of numbers that can be matches instead of one unique number.

Many methods exist for granting or revoking a user's access to selected facilities or files within a data processing system. These techniques often utilize a secret "key" or "password" entered by a user and recognized within the data processing system as an indication of the user's ability to read, write, delete, copy or append a selected record. One example of such a system is disclosed in U.S. Pat. No. 4,799,258. Further, several known techniques exist for storing such "keys," "passwords" or other secure data within secure storage devices within a data processing system. For example, U.S. Pat. No. 4,949,927 discloses a method for providing a security module for physically protecting such sensitive data. Similarly, U.S. Pat. No. 4,759,062 discloses a method for protecting sensitive data, such as private security codes.

Each of the methods described above permits the storage and utilization of sensitive or private data; however, none of these publications teaches a technique whereby the functional characteristics of a data processing system may be selectively altered. Systems do exist for enabling or disabling electronic equipment utilizing "keys" or other similar devices. Primarily such systems are directed to enabling or disabling reception of television or CATV signals within a television receiver. For example, see U.S. Pat. Nos. 4,577,224 and 4,471,379.

From U.S. Pat. No. 5,200,999 a public key cryptosystem key management based on control vectors is known. This serves for encrypting the public and private keys of a cryptographic asymmetric key (public key) algorithm, when these keys are stored outside the secure boundary of the cryptographic facility (i. e., cryptographic hardware) and for decrypting these keys when they are processed or used within the secure boundary of the cryptographic facility. The encrypted keys may be kept in a cryptographic key data set belonging to the cryptographic system software or they may be managed by the cryptographic application programs that use the keys. The public and private keys are encrypted by a system master key stored in clear form within the secure boundary of the cryptographic facility.

U.S. Pat. No. 4,908,861 discloses a data authentication method using modification detection codes based on a public one way encryption function. According to this method a message of arbitrary length is transformed into a block of fixed length defined modification detection code (MDC). Although there are a large number of messages which result in the same MDC, because the MDC is a many-to-one function of the input, it is required that it is practically not feasible for an opponent to find them. In analyzing the methods, a distinction is made between two types of attacks, i.e., insiders (who have access to the system) and outsiders (who do not).

From TDB No. 11, April 1992, pages 376–383 the solution of a certain concurrence related to the RSA public key cryptosystem is addressed. The underlaying RSA public key cryptosystem is known from R. L. Rivest, A. Shamir and L. Adleman, "A Method for Obtaining Digital Signatures and Public Key Cryptosystems," Communications of the ACM 21, 2 (February 1978). In TDB Vol. 36, No. 10, October 1993, pages 413–416 a protocol is disclosed for one-way authentication in the asymmetric model. In this protocol, a prover convinces a verifier that the prover knows the factus of large composite number N. The prover does this in a way that it does not reveal the factors of N. This protocol is useful for the software licensing problem.

In electronic design, Apr. 17, 1995, page 96, an overview of different encryption techniques, especially the RSA public key concept is given.

In U.S. Pat. No. 5,365,587 a system is disclosed for selectively altering the functional characteristics of a data processing system without physical or mechanical manipulation by providing an access code from a remote personal identification number generator to a secure controller and store of the computer system. This enables remote authorization of change in function of the computer system, such as performance tune up, speeding clock time, changing function and like changes. The computer system is first manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from nonvolatile memory into a nonscannable register within a secure portion of a control logic circuit each time power is applied to the data processing system and the definition is then utilized to enable only selected functional characteristics. Alternate functional characteristics may thereafter be selectively enabled by entering a security code which matches one of a number of preloaded codes and an encoded alternate functional characteristic definition. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

In summary, the prior art is silent as to the usage of encryption techniques to verify the configuration of a computer system.

The underlying problem of the invention is to provide a method for verifying the configuration of a computer system, a method for encryption of data being expressive of the configuration of a computer system and a computer system for carrying out such a method.

The problem of the invention is solved by the features set forth in the independent claims.

Data which is expressive of the configuration of a computer system advantageously is encrypted during manufacturing of the computer system. This is done by using an identifier which is assigned to the computer system or a component thereof during manufacturing. The private key which is used for the encryption of the encoded data is only known to the manufacturer of the computer system.

The RSA cryptosystem preferably is used for encryption of the encoded data (cf. R. L. Rivest, A. Shamir and L. Adleman "A Method for Obtaining Digital Signatures and Public-Key Cryptosystems", Communications of the ACM, February 1978, Vol. 21, No. 2). For encoding the data by means of the identifier, the identifier can for example simply be added to the data. For decoding the identifier is subtracted later on from the encoded data. Also the DES method can be used whereby the identifier of the computer system is employed as a secret key (cf. Cheryl Ajluni, "Security Techniques Ensure Privacy", Electronic Design, Apr. 17, 1995, page 98).

The encrypted data can be stored in any kind of storage device of the computer system, for example on an EPROM or on a diskette. The encrypted data can already be stored in the computer system during manufacturing. However, it is also possible to transmit the encrypted data to the computer system via a telephone line, ISDN or other telecommunication means when the computer system is already installed at the customer. This is advantageous if the configuration of the computer system is changed, a new set of encrypted data reflecting the changed configuration of the computer system is transmitted and stored on the storage device of the computer system. This saves a service engineer of the manufacturer of the computer system from travelling to the customer site in order to change the encrypted data according to the new configuration.

Once the encrypted data is stored on a storage device of the computer system, the encrypted data is used for verifying the configuration. This serves to protect the computer system against unauthorized changes of its configuration. This can be a requirement for technical reasons or can serve as asset protection for the manufacturer of the computer system.

The first step for verifying the configuration is to receive the encrypted data. This is accomplished by reading the encrypted data from the storage device of the computer system on which the encrypted data has been stored during manufacturing or by receiving the encrypted data via a telecommunications link directly from the manufacturer. Thereafter the encrypted data is decrypted, preferably using a public key of the RSA cryptosystem. This yields the decoded data which has been encoded by means of the identifier. The identifier is available in the computer system, preferably in electronically readable form. For example, the identifier can be stored in one of the components of the computer system by a number of fuses which are blown according to the identifier of that component. This identifier can also serve as an identifier for the entire computer system. In order to prevent the cloning of the computer system with another computer system having another identifier, the identifier has to be unchangeable. This can be guaranteed by storing the identifier in a component of the computer system which is exclusively produced by the manufacturer of the computer system. It is also preferable that the identifier is unique. However, absolute uniqueness is normally not required. If for example every thousandth computer system which is manufactured by the same manufacturer has an identical identifier, this would be a sufficient degree of security.

If the private and the public key match and if the same identifier is used for the encoding and decoding of the data then this yields the data which is expressive of the configuration of the computer system stored during manufacturing. The configuration data of the computer system is also stored on a storage device of the computer system in unencoded form. These configuration data are compared to the decoded data. If there is a match between the decoded data and the unencoded configuration data this means that the customer is authorized to use this configuration of the computer system. Preferably, this method for verifying of the configuration is carried out by means of microcode every time the computer system is booted.

Alternatively—instead of decoding the decrypted data—it is also possible to encode the configuration data which is stored in an encoded form in the computer system and to compare the encoded data with the encoded configuration data.

If the data and the configuration data do not match it is possible not to enable or to disable the entire system. An alternative is to enable the computer system only insofar as the data and the configuration data match. This can be advantageous in the following scenario: A customer is assumed to have purchased a memory expansion card for the computer system from a third party which is not authorized by the manufacturer of the computer system to deliver such memory expansion cards. The memory expansion card is inserted into the computer system and the configuration data which is normally stored on a hard disk of the computer system is changed correspondingly. This change of the configuration data can be carried out easily since the configuration data is present in the computer system in an unencoded and unprotected form. However, when the computer system is booted the encrypted data which is provided by the manufacturer of the computer system is decoded and decrypted and subsequently compared to the unencoded configuration data. In the example considered here the data and the configuration data match with the exception of the memory expansion card. As a consequence this memory expansion card is ignored and the computer system is initialized during the booting procedure so that the memory expansion card is not addressable. This can also be done with other functional characteristics of the computer system, such as the cycle time. A method for selectively altering the functional characteristics as such is known from U.S. Pat. No. 5,365,587.

In order to circumvent the method for verifying of a configuration of a computer system a third party could analyze the microcode which serves to carry out this method and find a way to bypass the corresponding portions of the microcode. This can be prevented if the microcode is also protected against tampering. This can be accomplished for example by special check sums of the microcode which are predefined and checked by a special routine periodically. From IBM Technical Disclosure Bulletin, No. 9, February 1992, pages 188–191 a mechanism for Trusted Computing Base definition and checking is known which could also be used to prevent a third party from altering or bypassing the microcode.

BRIEF DESCRIPTION OF THE DRAWINGS

One way of carrying out the invention is described in detail below with reference to drawings which illustrate only one specific embodiment, in which.

DETAILED DESCRIPTION OF THE INVENTION

Figure 1:
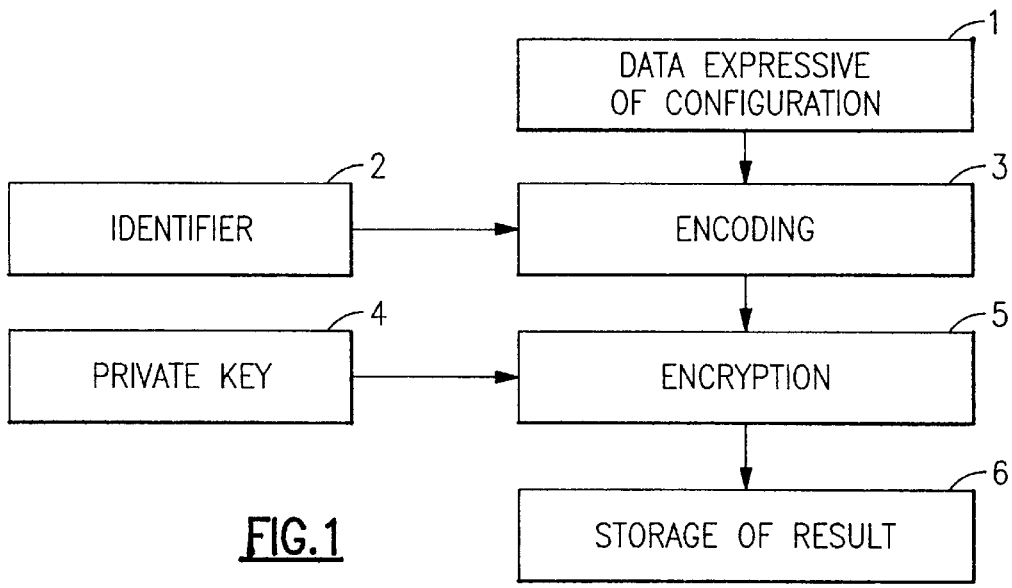
FIG. 1 is a flow chart illustrating the method for encryption of data.

In step 1 of the flow chart shown in FIG. 1 the configuration of the computer system is defined by the manufacturer of the computer system. This results in data which is expressive of the specific configuration of the computer system considered here. In step 2 a unique and unchangeable identifier of the computer system is defined. The identifier is stored in a portion of the computer system where it is protected against tampering. In this example the identifier is stored on the clock chip of the computer system which is a specialized card which can not be produced or delivered by any third party. The clock chip is personalized by blowing a number of fuses according to the identifier. The identifier is used in step 3 to encode the data which is expressive of the configuration of the computer system. This is accomplished—in the prefered embodiment considered here—by by simply adding the identifier which is assumed to be a string of binary data to the data which is expressive of the configuration. Any algorithm using the identifier as a key could be used for encoding of the data, if the identifier can also be used for decoding of the encoded data according to the algorithm.

In step 4 the private key required for the encryption algorithm is fetched. Subsequently, the encoded data is encrypted in step 5 by means of the private key. The resulting encrypted data of step 5 is stored in the computer system in step 6 for example in an EPROM of the computer system.

When the computer system is booted on the customer site this result of the encryption of step 5 is outputted by the EPROM (step 7). Then the public key which is required for decryption of result is fetched from the hard disk of the computer system. In step 9 the decryption of the result is carried out by means of the public key. In step 10 the identifier is read from the clock chip of the computer system. The result obtained by the decryption of step 9 is decoded by means of the identifier in step 11. In the example considered here this is accomplished by subtracting the identifier from the result obtained in step 9.

In step 12 the configuration data is read from the hard disk of the computer system. The configuration data is compared to the result of step 11 in step 13. If there is a perfect match the booting procedure normally continuous and all the hardware is enabled as defined by the configuration data in step 14. If there is no perfect match one possibility is to simply stop the booting procedure so that the entire computer system is not usable (step 15). Another possibility is to selectively enable the functional characteristics of the computer system insofar as there is a match between the result obtained in step 11 and the configuration data read in step 12.

Figure 2:
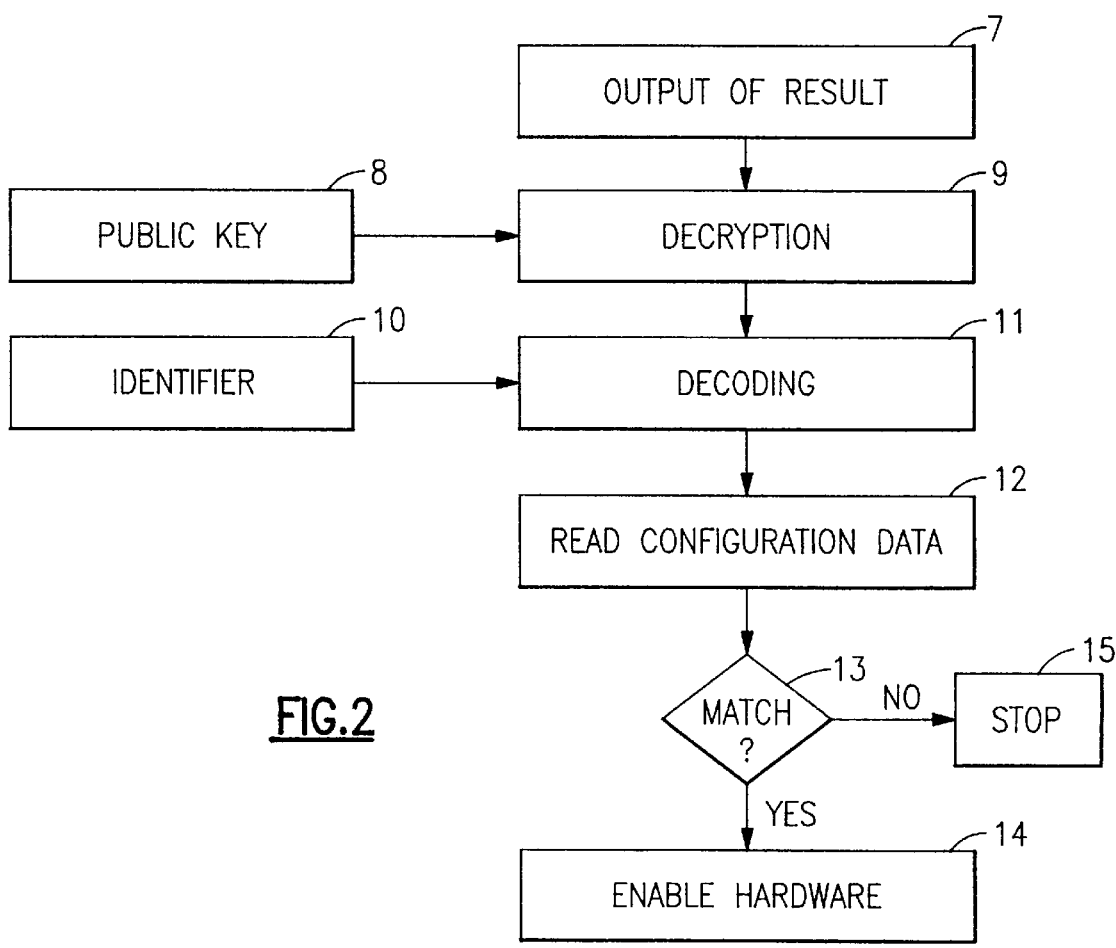
FIG. 2 is a flow chart illustrating the method for verifying of the configuration of the computer system.
Figure 3:
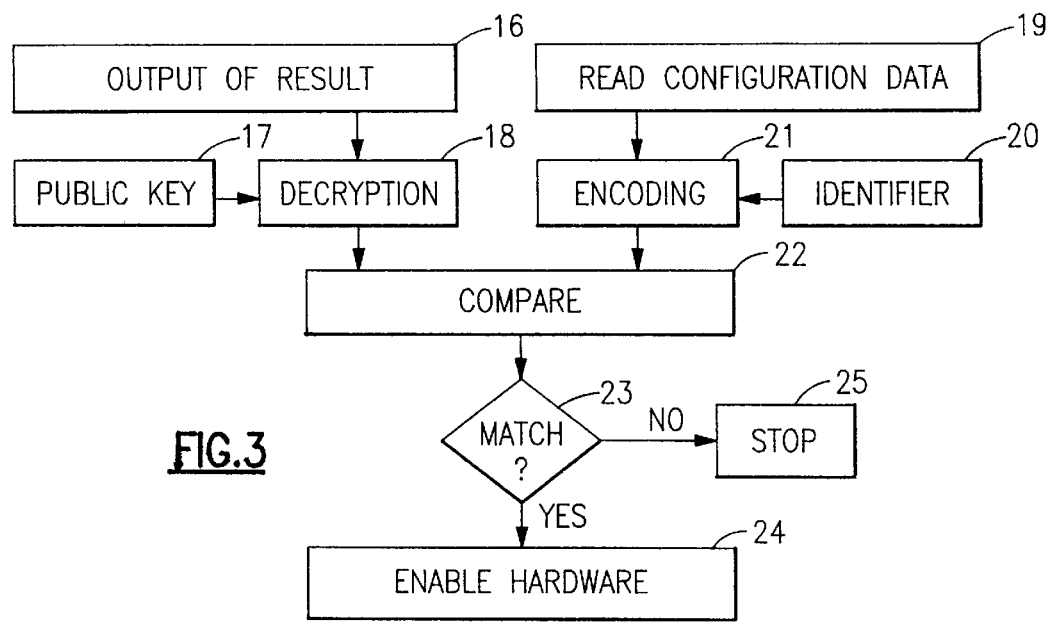
FIG. 3 is a flow chart illustrating an alternative method for verifying of the configuration of the computer system.

FIG. 3 shows an alternative way of carrying out the method illustrated in FIG. 2. In step 16 of FIG. 3 the result obtained in step 6 is outputted from the EPROM of the computer system. The following steps 17 and 18 of FIG. 3 corresponds to the steps 8 and 9 of FIG. 2 and serve to decrypt the result which was outputted in step 16.

In step 19 the configuration data is read from the hard disk of the computer system. Step 19 in FIG. 3 corresponds to step 12 in FIG. 2. Subsequently the configuration data which is read in FIG. 19 is encoded in step 21 by means of the identifier which is fetched from the clock ship in step 20. The results of the decryption of step 18 and the encoding of step 21 are compared in step 22. Based on the comparison carried out in step 22 it is decided in step 23 whether the decrypted data of step 18 and the encoded data of step 21 match. If there is a match step 24 is carried out which corresponds to step 14 of FIG. 2. If there is no match step 25 is carried out which corresponds to step 15 of FIG. 2.

Figure 4:
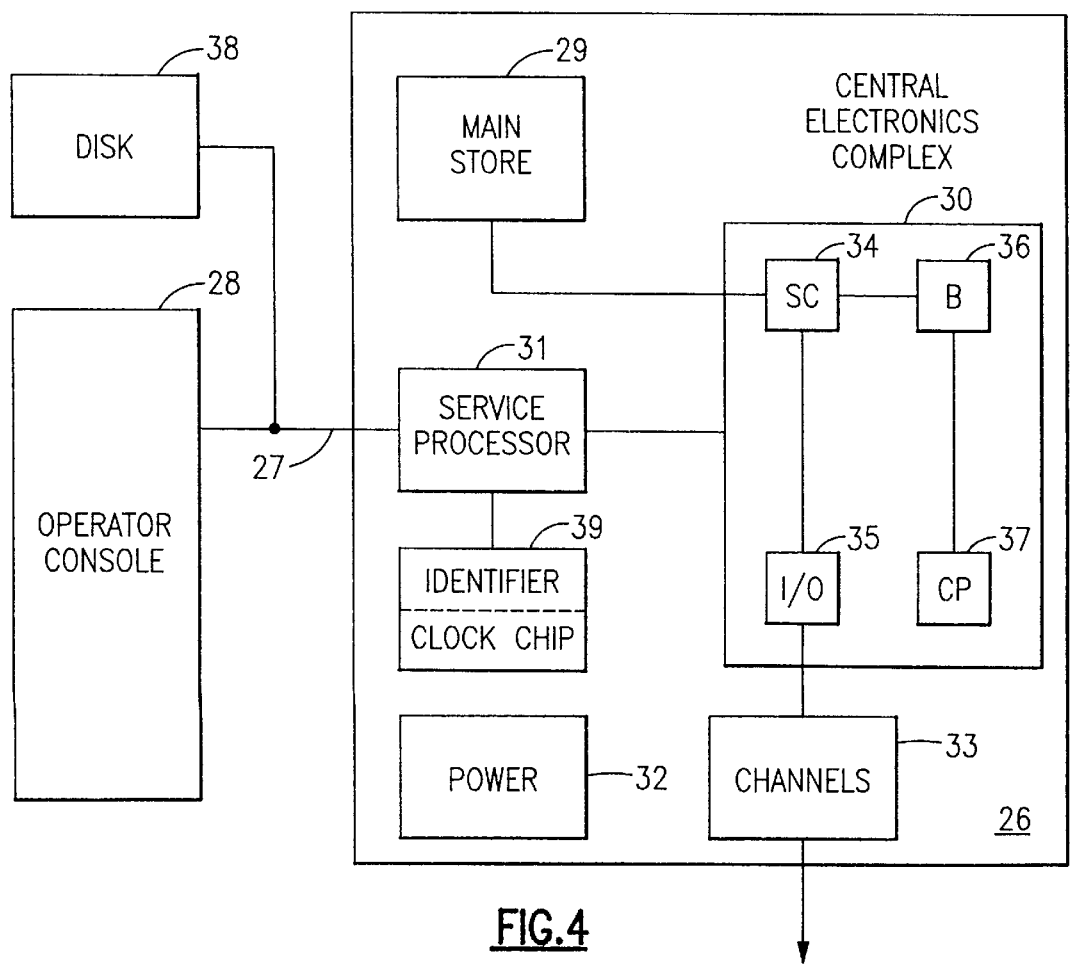
FIG. 4 is a schematic block diagram of a computer system which may be utilized to implement the method and system of the present invention.

For an overview of the computer system, the data processing system which can be selectively altered for functional characteristics without physical or mechanical manipulation, refer to FIG. 4. FIG. 4. depicts a high level block diagram of a data processing system which may be utilized to implement the method and system of the present invention. As illustrated, the data processing system includes a computer 26 having a data link 27 and an operator console 28 coupled in a manner well known in the art. Many of the high level components within computer 26 are depicted within FIG. 4 including main store 29, which serves as the main electronic storage within computer 26, and a central electronic complex 30 is also depicted. As will be explained in greater detail herein, central electronic complex 30 may include multiple multi chip modules which serve to perform the various functions of the central electronic complex, or alternately, central electronic complex 30 may be provided with a single high density circuit and include integrated circuit devices equivalent to several million transistors.

A service processor 31 is provided and is preferably coupled between operator console 28 and central electronic complex 30 to provide access to the functions and circuitry therein. A power supply 32 and input/output channels 33 are also typically provided in such a computer system, as those skilled in the art will appreciate.

Still referring to FIG. 4, the high level segments of central electronic complex 30 are illustrated. In a modern mainframe computer such as the International Business Machines Corporation System/390 (System/390 is a registered trademark of International Business Machines Corporation) the central electronic complex typically includes 1 or more multiple chip modules which serve to address various functions within a central electronic complex. As illustrated within FIG. 4, central electronic complex 30 includes an SC module 34 which preferably serves to buffer and control the flow of data between main store 29, input/output module 35 and various processes within computer 26. Input/output module 35 preferably serves to control and buffer data between input/out channels 33 and main store 29 in a manner well known in the art. Similarly, B-module 36 is provided to buffer and control instructions and data for the processor and CP-module 37 serves to execute instructions within computer 26. As those skilled in the art will appreciate, each of these multi chip modules 34, 35, 36 and 37 constitutes a highly complex electronic module which may include more than 100 integrated circuit devices, each equivalent to thousands or millions of transistors.

Additionally, as those skilled in the art will appreciate, a translation look aside buffer (TLB) is also provided and is utilized, in a manner well known in the art, to translate virtual memory address into real memory addresses within main store or other locations within computer 26.

Mainframe computers such as the International Business Machines Corporation System/390 may include multiple levels of functional capability which may be provided by altering the range of memory that may be accessed within a particular computer system, the number or percentage of processors which are enabled within a particular computer, the amount of usable cache memory within a particular computer and the processors speed and/or capability provided within a particular computer. Thus, by providing computer 26 with the capability of all these functional characteristics during the manufacturing process a selected subset or variations of those functional characteristics may be enabled utilizing the method and system of U.S. Pat. No. 5,365,587.

Furthermore, the computer 26 comprises a clock chip 39 having the identifier stored therein by means of a number of fuses. The identifier is unique, unchangeable and electronically readable by the service processor 31 to which the clock chip 39 is connected. The computer system shown in FIG. 4 further comprises a hard disk 38. The hard disk 38 serves to receive the encrypted data which is encrypted according to the method of the invention. The encrypted data can be stored on the disk 38 during manufacturing. If the configuration of the computer system is changed a new set of encrypted data can be stored on the disk 38 at the customer site. It is also possible to input the updated encrypted data via the channels 33 into the computer 26 and to store the updated encrypted data on the disk 38 under the control of the service processor 31. Every time the computer system depicted in FIG. 4 is booted the service processor 31 accesses the disk 38 in order to read the encrypted data. The service processor 31 also accesses the disk 38 to read the public key needed for decryption according to the RSA method. The decryption of the encrypted data read from the disk 38 is carried out by the service processor 31 whereby usage is made of the public key. When the service processor 31 accesses the clock chip 39 in order to read the identifier.

Subsequently, the service processor 31 decodes the decrypted data and compares the result with the actual configuration data stored in unencrypted form on the disk 38. Alternatively the service processor 31 is programmed to encode the actual unencrypted configuration data by means of the identifier in order to compare the decrypted data and the encoded actual configuration data.

In response to the comparison carried out in service processor 31 the computer system is enabled according to the actual configuration data if a perfect match occurs. The selective enabling of functional characteristics of the computer system 26 advantageously is carried out according to the method disclosed in U.S. Pat. No. 5,365,587. If the comparison carried out by the service processor 31 reveals that there is no perfect match this can cause the interruption of the booting procedure so that the entire computer system is disabled. Alternatively only those functional characteristics of the actual configuration data stored on disk 38 which match the encrypted data are enabled selectively.

It is also possible to program the service processor 31 to carry out the method of the invention not during the initialization of the computer system 26 but during normal operation. If a mismatch occurs this can lead to a shut down of the entire computer system 26. Alternatively only those features of the computer system which correspond to configuration data which do not match the decrypted configuration data are disabled.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention as defined in the following claims.

I claim:

1. A method for the verifying of data, said data being expressive of a configuration of a computer system, said computer system or a component thereof having an identifier, said method comprising the steps of:

a) encoding said data by an encoding method, said encoding method using said identifier to encode said data to produce encoded data;

b) encrypting said encoded data by an encryption method, said encryption method using a private key;

c) receiving said encrypted data;

d) decrypting said encrypted data using a public key, said decrypting of said encrypted data producing said encoded data, said encoded data capable of being decoded via a decoding method using said identifier;

e) decoding said encoded data via said decoding method using said identifier to decode said encoded data producing said decoded configuration data; and f) comparing said decoded configuration data with said configuration data stored in said computer system, said configuration data being expressive of the configuration of the computer system.

2. A method according to claim 1 wherein if said comparing of said decoded data with said configuration data stored in said computer system indicates a match therebetween, the method further includes the step of:

enabling a functional characteristic of the computer system.

3. A method according to claim 2 wherein said functional characteristic is a cycle time for the computer system.

4. A method according to claim 2 further including the steps of:

receiving said encrypted data;

decrypting said encrypted data using a public key, said decrypting of said encrypted data producing said encoded data;

decoding said encoded data via a decoding method using said identifier; and comparing said decoded data with a copy of said data expressive of the configuration of the computer system, said copy being stored in said computer system.

5. A method according to claim 1 further including the steps of:

receiving said encrypted data;

decrypting said encrypted data using a public key, said decrypting of said encrypted data producing said encoded data;

encoding, using an encoding method, a copy of said data expressive of the configuration of the computer system, said copy being stored in said computer system, said encoding method using said identifier to produce encoded configuration data; and comparing said encoded data with said encoded configuration data.

6. A method according to claim 1 for selectively enabling the functional characteristics of said computer system, said method comprising the steps of:

enabling one or more of said functional characteristics of said computer system if said comparing step indicates a match as regards said functional characteristics.

7. A method for the verifying of data, said data being expressive of a configuration of a computer system, said computer system or a component thereof having an identifier, said method comprising the steps of:

a) encoding said data by an encoding method, said encoding method using said identifier to encode said data to produce encoded data;

b) encrypting said encoded data by an encryption method, said encryption method using a private key;

c) receiving said encrypted data;

d) decrypting said encrypted data using a public key, said decrypting of said encrypted data producing said encoded data;

e) encoding said configuration data stored in said computer system by said encoding method, said encoding method using said identifier to encode said stored configuration data so as to produce encoded configuration data, said stored configuration data being expressive of the configuration of the computer system; and f) comparing said encoded data with said encoded configuration data.

8. A method according to claim 7 wherein if said comparing of said encoded data with said encoded configuration data indicates a match therebetween, the method further includes the step of:

enabling a functional characteristic of the computer system.

9. A method according to claim 8 wherein said functional characteristic is a cycle time for the computer system.

10. A method according to claim 7 wherein if said comparing of said decoded configuration data with said stored configuration data indicates a match therebetween as regards a functional characteristic of the computer system, the method further includes the step of:

enabling said functional characteristic of the computer system.

11. A computer system comprising:

means for the reception of encrypted data, said encrypted data being encrypted via an encryption method using a private key;

means for decryption of said encrypted data to yield encoded data, said means for decryption using a public key;

means for decoding said encoded data to yield decoded data, said means for decoding comprising means for accessing an identifier, said identifier being associated with said computer system or with a component thereof; and means for comparing said decoded data with configuration data stored in said computer system, said stored configuration data being expressive of the configuration of the computer system.

12. A computer system according to claim 11 further comprising:

enabling means for enabling a functional characteristic of the computer system;

wherein said enabling means is responsive to said means for comparing said decoded data with said configuration data stored in said computer system to enable said functional characteristic if there is a match therebetween.

13. A computer system according to claim 12 wherein said functional characteristic is a cycle time for said computer system.

14. A computer system according to claim 11 further comprising means for selectively enabling a functional characteristic of said computer system.

15. A computer system comprising:

means for the reception of encrypted data, said encrypted data being encrypted via an encryption method using a private key;

means for decryption of said encrypted data to yield encoded data, said means for decryption using a public key;

means for encoding configuration data stored in said computer system, said stored configuration data being expressive of the configuration of the computer system, said means for encoding using an identifier to encode said configuration data, said identifier being associated with said computer system or with a component thereof; and means for comparing said encoded data with said encoded configuration data.

16. A computer system according to claim 15 further comprising:

enabling means for enabling a functional characteristic of the computer system;

wherein said enabling means is responsive to said means for comparing said encoded data with said encoded configuration data to enable said functional characteristic if there is a match therebetween.

17. A computer system according to claim 16 wherein said functional characteristic is a cycle time for said computer system.

18. A computer system according to claim 15 further comprising means for selectively enabling a functional characteristic of said computer system.

19. An apparatus for the encryption of data, said data being expressive of a configuration of a computer system, said computer system or a component thereof having an identifier, said apparatus comprising:

means for encoding said data by an encoding method, said encoding method using said identifier to produce encoded data; and means for encrypting said encoded data by an encryption method, said encryption method using a private key.

20. An apparatus according to claim 19 wherein said encryption method includes applying the RSA algorithm.

* * * * *

UNITED STATES PATENT AND TRADEMARK OFFICE
CERTIFICATE OF CORRECTION

PATENT NO.   : 5,982,899
DATED        : November 9, 199
INVENTOR(S)  : Probst

It is certified that error appears in the above-identified patent and that said Letters Patent is hereby corrected as shown below:

Title page, item [54] and col. 1, line 2, delete "THE" and insert --OF A--.

Signed and Sealed this

Twenty-fourth Day of October, 2000

Attest:

Q. TODD DICKINSON

*Attesting Officer*          *Director of Patents and Trademarks*